(12) United States Patent
Kou et al.

(10) Patent No.: US 11,155,367 B2
(45) Date of Patent: Oct. 26, 2021

(54) SINGLE-AXIS POINTING PURE MAGNETIC CONTROL ALGORITHM FOR SPACECRAFT BASED ON GEOMETRICAL ANALYSIS

(71) Applicant: AEROSPACE DONGFANGHONG DEVELOPMENT LTD, Guangdong (CN)

(72) Inventors: Yimin Kou, Guangdong (CN); Bibo Guo, Guangdong (CN); Lijun Xue, Guangdong (CN); Shilong Wei, Guangdong (CN); Yanbo Ji, Guangdong (CN); Qin Yuan, Guangdong (CN); Yingchun Zhang, Guangdong (CN)

(73) Assignee: AEROSPACE DONGFANGHONG DEVELOPMENT LTD, Guangdong (CN)

( * ) Notice: Subject to any disclaimer, the term of this patent is extended or adjusted under 35 U.S.C. 154(b) by 271 days.

(21) Appl. No.: 16/300,583

(22) PCT Filed: Sep. 2, 2016

(86) PCT No.: PCT/CN2016/097885
§ 371 (c)(1),
(2) Date: Nov. 12, 2018

(87) PCT Pub. No.: WO2017/193511
PCT Pub. Date: Nov. 16, 2017

(65) Prior Publication Data
US 2019/0283905 A1    Sep. 19, 2019

(30) Foreign Application Priority Data
May 13, 2016  (CN) .......................... 201610323291.7

(51) Int. Cl.
B64G 1/24      (2006.01)
G05B 17/02     (2006.01)
G06F 17/13     (2006.01)

(52) U.S. Cl.
CPC ............. *B64G 1/242* (2013.01); *G05B 17/02* (2013.01); *B64G 2001/245* (2013.01); *G06F 17/13* (2013.01)

(58) Field of Classification Search
None
See application file for complete search history.

(56) References Cited

U.S. PATENT DOCUMENTS

| 4,084,773 A | 4/1978 | Schmidt, Jr. et al. |
| 7,376,496 B1 | 5/2008 | Weigl et al. |

FOREIGN PATENT DOCUMENTS

| CN | 1983098 | 6/2007 |

OTHER PUBLICATIONS

Xiang et al., "Attitude recovery of pico-satellites based on fully magnetic control algorithm", Journal of Zhejiang University (Engineering Science), May 2013, pp. 843-852.
(Continued)

*Primary Examiner* — Bao Long T Nguyen
*Assistant Examiner* — Bakari Underwood
(74) *Attorney, Agent, or Firm* — JCIPRNET (57) ABSTRACT

Provided is a single-axis pointing pure magnetic control algorithm for a spacecraft based on geometrical analysis to realize single-axis pointing control of the spacecraft through the pure magnetic control algorithm in which a magnetic torque is only output by a magnetorquer to interact with a geomagnetic field to generate a control torque. The algorithm uses a spatial geometry method to obtain an optimally controlled magnetic torque direction, thereby designing a PD controller. The problem that the traditional magnetic control method is low in efficiency and even cannot be
(Continued)

controlled is overcome. The algorithm is simple and easy, can be used in the attitude control field of spacecrafts, and achieves the pointing control in point-to-sun of a solar array and point-to-ground of antennae.

2 Claims, 7 Drawing Sheets

(56) References Cited

OTHER PUBLICATIONS

Zhang et al., "Single Axis Pointing Control for Underactuated Flexible Spacecraft", Journal of Astronautics, Jul. 2011, pp. 1491-1501.
"International Search Report (Form PCT/ISA/210)", dated Feb. 16, 2017, with English translation thereof, pp. 1-4.
Yimin Kou, et al., "A single-axis pointing magnetic control method for microsatellite." 2016 IEEE International Conference on Information and Automation, Aug. 1-3, 2016, pp. 671-674.
Xi Chen, et al., "Model predictive control of cube satellite with magneto-torquers." The 2010 IEEE International Conference on Information and Automation, Jun. 20-23, 2010, pp. 997-1002.
Jaime Rubio Hervas, et al., "Three-axis magnetic attitude control algorithms for small satellites in the presence of noise." 2012 12th International Conference on Control, Automation and Systems, Oct. 17-21, 2012, pp. 1342-1347.
Reyhanoglu M, et al., "Attitude stabilization of small satellites using only magnetic actuation." 2008 34th Annual Conference of IEEE Industrial Electronics, Nov. 10-13, 2008, pp. 103-107.
H. Bolandi, et al., "Stable Supervisory-Adaptive Controller for Spinning Satellite using Only Magnetorquers." IEEE Transactions on Aerospace and Electronic Systems, vol. 45, No. 1, Jan. 1, 2009, pp. 192-208.
"Search Report of Europe Counterpart Application", dated Dec. 16, 2019, p. 1-p. 9.

SINGLE-AXIS POINTING PURE MAGNETIC CONTROL ALGORITHM FOR SPACECRAFT BASED ON GEOMETRICAL ANALYSIS

CROSS-REFERENCE TO RELATED APPLICATION

This is a 371 application of the International PCT application serial no. PCT/CN2016/097885, filed on Sep. 2, 2016, which claims the priority benefits of China Application No. 201610323291.7, filed on May 13, 2016. The entirety of each of the above-mentioned patent applications is hereby incorporated by reference herein and made a part of this specification.

BACKGROUND OF THE INVENTION

Technical Field

The invention relates to the technical field of spacecraft, in particular to a single-axis pointing pure magnetic control algorithm for a spacecraft.

Description of Related Art

Figure 1:
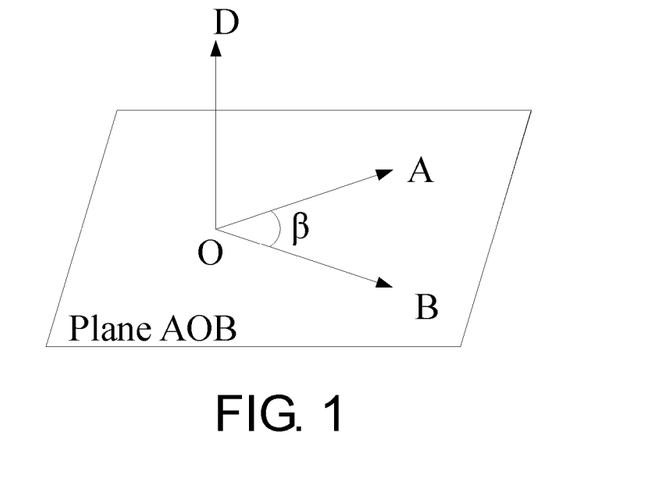
FIG. 1 is a schematic diagram of the single-axis pointing control.

In a particular working mode, a spacecraft often needs to point an axis on a body system to a specific location in space, such as pointing a negative normal axis of a solar array to the direction of a sun vector, and pointing a communication antenna to the center of the earth, etc., which requires a single-axis pointing control. The problem to be solved by the single-axis pointing control is as shown in FIG. 1. $\overrightarrow{OB}$ in the figure is a unit vector in a certain axial direction (referred to as a body axis) under the body system of an aircraft; the unit vector $\overrightarrow{OA}$ points to a certain target azimuth under the inertial space (referred to as a target axis); the inclined angle of the unit vector and the target azimuth is β; it is necessary to generate a magnetic torque by a magnetorquer and then the magnetic torque interacts with a geomagnetic field to generate a control torque $\vec{T}$ to control the rotation of the aircraft, and finally the body axis coincides with the target axis. In the most ideal case (regardless of rotational inertia distribution and the current angular velocity in each axial direction), the optimal direction of the desired control torque $\vec{T}$ is along the direction $\overrightarrow{OB} \times \overrightarrow{OA}$, i.e., the direction $\overrightarrow{OD}$ perpendicular to the plane AOB and satisfied with the right-hand rule (this direction is referred to as the optimal rotation axis). If a single-axis PD control rate is used in this case, the magnitude of $\vec{T}$ can be calculated according to the following equation:

$$T = K_p \beta - K_d \dot{\beta} \tag{1}$$

where $K_p$ and $K_d$ are proportional differential control coefficients, respectively.

Figure 2:
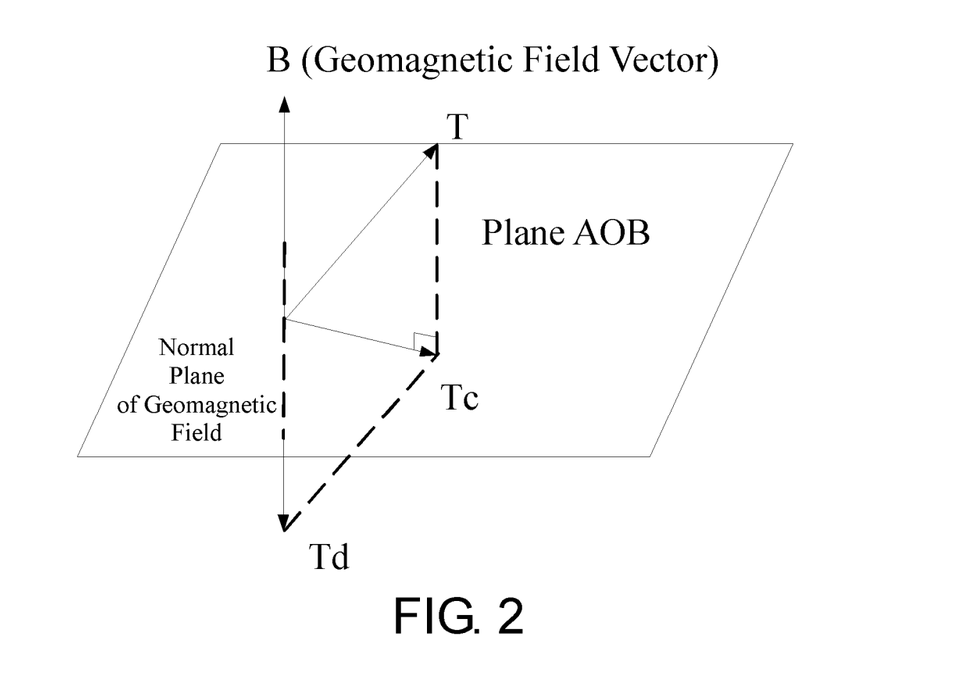
FIG. 2 is a comparison diagram of a control torque generated by a magnetorquer and a desired control torque.
Figure 3:
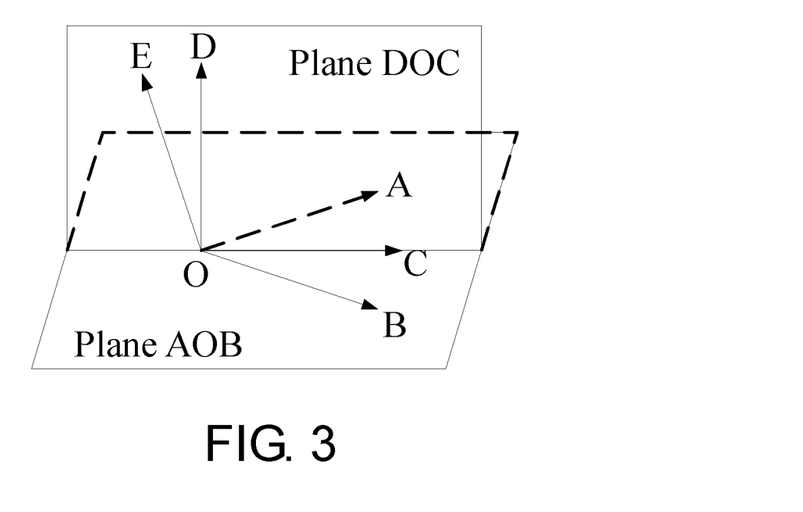
FIG. 3 is a schematic diagram of Lemma 1.

However, the truth is that the direction of the torque that the magnetorquer can output is limited by the direction of the geomagnetic field at the position where the aircraft is located, and cannot point to any direction, but only in the normal plane (the plane perpendicular to a geomagnetic field vector) of the local geomagnetic field. Due to the above limitation, it is only possible to approximate T by a projection torque $T_c$ of the desired control torque T in the normal plane of the geomagnetic field, where the desired torque T is a component of the actual control torque $T_c$, as shown in FIG. 2. In the figure, $\vec{T}_c$ is the projection of $\vec{T}$ in the normal plane of the geomagnetic field. Since $\vec{T}$ is not coincident with $\vec{T}_c$, $\vec{T}_c$ also generates an interference torque component $\vec{T}_d$ in addition to an effective control torque component $\vec{T}$. In order to generate a magnetic control torque $\vec{T}_c$, the magnetic torque $\vec{M}$ that the magnetorquer needs to output can be calculated by equation (2):

$$\vec{M} = \frac{\vec{B} \times \vec{T}}{\|\vec{B}\|^2} \tag{2}$$

where $\vec{B}$ is the local geomagnetic field vector, the actual control torque $\vec{T}_c$ generated in this case is:

$$\vec{T}_c = \vec{M} \times \vec{B} = \vec{T} - \left(\frac{\vec{B}}{\|B\|} \cdot \vec{T}\right)\frac{\vec{B}}{\|B\|} \tag{3}$$

where T is the desired control torque, and $$\vec{T} = -\left(\frac{\vec{B}}{\|B\|} \cdot \vec{T}\right)\frac{\vec{B}}{\|B\|}.$$

It can be seen from the above equation that the larger inclined angle of the magnetic field vector $\vec{B}$ and the desired control torque $\vec{T}$ leads to a larger interference torque $\vec{T}_d$, and the interference torque is zero when the magnetic field vector and the desired control torque are perpendicular.

In order to ensure the effectiveness of the control (the effect of the effective control torque exceeds the effect of the interference torque), an effective control threshold is usually set, for example, the control output is generated only when $T > T_d$ or the inclined angle of $\vec{T}$ and $\vec{T}_c$ is less than 45°. In the field of actual spacecraft engineering, limited by the direction of the geomagnetic field, the above-mentioned threshold requirement often cannot be reached in many positions on the spacecraft orbit. At these positions, the magnetic control algorithm will be in a stop state.

It can be seen from the above analysis that the existence of an interference torque $\vec{T}_d$ in the conventional magnetic control algorithm has a negative impact on the control effect on the one hand, and often causes a controller to be in a stop state on the other hand. In addition, a rotation tendency (described by an angular acceleration) generated by the control amount is also related to the rotational inertia of a rigid body, the angular velocity of the rigid body, etc., which further increases the complexity of a control system.

BRIEF SUMMARY OF THE INVENTION

The object of the invention is to provide a single-axis pointing pure magnetic control algorithm for a spacecraft based on geometric analysis, which solves the problem of high complexity of the control system in the prior art.

To achieve the above object, the invention is implemented by the following technical solution:

A single-axis pointing pure magnetic control algorithm for a spacecraft based on geometrical analysis: comprising the following steps:

① acquiring the following data: coordinates of three vectors (a target azimuth vector $\overrightarrow{OA}$, a body axis vector $\overrightarrow{OB}$ and a geomagnetic field vector $\vec{B}$) in a body system and an aircraft inertia matrix I;

② acquiring a pair of non-parallel vectors X and Y in a normal plane of a geomagnetic field;

③ calculating a unit normal vector Z' of an angular acceleration plane:

$$X' = I^{-1}X$$
$$Y' = I^{-1}Y$$
$$Z' = \frac{X' \times Y'}{\|X' \times Y'\|}$$

where I refers to the aircraft inertia matrix, X' and Y' are affine transformed vectors of X and Y and are approximately in a plane of an angular acceleration generated by a magnetic torque;

④ acquiring an optimal control rotation axis $\overrightarrow{OE}$ by the following equation:

$$\overrightarrow{OE} = \text{NORM}((\overrightarrow{OB} + \overrightarrow{OA}) \times (\overrightarrow{OB} \times \overrightarrow{OA}) \times Z')$$

where NORM is a vector normalization operator;

⑤ adjusting control coefficients and calculating a magnetic control torque T, wherein T must be in the normal plane of the geomagnetic field in this case, and the magnetic control torque T is calculated specifically by: calculating the magnitude and direction of a rotation angular acceleration, $$\dot{\omega}_r = (K_p \beta \overrightarrow{OE}) \text{sign}(\overrightarrow{OE} \cdot (\overrightarrow{OB} \times \overrightarrow{OA})) + K_m (\omega \cdot \overrightarrow{OE})$$

where $K_p$ refers to a control coefficient for producing a rotation tendency in the direction $\overrightarrow{OE}$; $\beta$ is the inclined angle of the body axis $\overrightarrow{OB}$ and the target axis $\overrightarrow{OA}$; sign is to obtain a positive/negative operator which is valued as 1 when the dot product of the vectors $\overrightarrow{OE}$ and $\overrightarrow{OD}$ is positive or valued as −1 when the dot product is negative, or valued as 0 when the body axis and the target axis are perpendicular; the optimal rotation axis $\overrightarrow{OD}$ is perpendicular to $\overrightarrow{OA}$ and $\overrightarrow{OB}$; $K_m$ refers to a control coefficient for limiting the angular velocity in the direction $\overrightarrow{OE}$ from overshoot; next, calculating a damped angular acceleration:

$$\dot{\omega}_d = K_d[\omega - (\omega \cdot Z')Z']$$

where $K_d$ refers to a control coefficient for dampening an angular velocity component in the angular acceleration plane; $\omega$ is the instantaneous angular velocity of the star, $(\omega \cdot Z')Z'$ is a component perpendicular to the angular acceleration plane in $\omega$, so $\omega - (\omega \cdot Z')Z'$ is a component in the angular acceleration plane in $\omega$; and then calculating a torque required to generate the rotation angular acceleration and the damped angular acceleration:

$$T = I(\dot{\omega}_r + \dot{\omega}_d);$$

⑥ calculating the required control magnetic torque M:

$$\vec{M} = \frac{\vec{B} \times \vec{T}}{\|\vec{B}\|^2}.$$

The invention has a beneficial effect that the single-axis pointing pure magnetic control algorithm for a spacecraft based on geometrical analysis of the invention realizes single-axis pointing control of the spacecraft through the pure magnetic control algorithm in which a magnetic torque is only output by a magnetorquer to interact with a geomagnetic field to generate a control torque. The algorithm overcomes the problem that the traditional magnetic control method is low in efficiency and even cannot be controlled. The algorithm is simple and easy, can be used in the control field of spacecrafts. The simulation results further prove that the method can realize single-axis pointing control such as point-to-ground of satellite antennas and thus can be used in a safety mode and specific control modes of spacecrafts.

DETAILED DESCRIPTION OF THE INVENTION

The invention will now be further described with reference to the accompanying drawings and specific embodiments.

Lemma 1: Two unit vectors, $\overrightarrow{OA}$ and $\overrightarrow{OB}$, are known. A unit vector $\overrightarrow{OC}$ is on the bisecting line of the inclined angle formed by the above-mentioned two vectors. The unit vector $$\overrightarrow{OD} = \frac{\overrightarrow{OB} \times \overrightarrow{OA}}{\|\overrightarrow{OB} \times \overrightarrow{OA}\|}$$

is perpendicular to the plane (Plane AOB) where $\overrightarrow{OA}$ and $\overrightarrow{OB}$ are located, $\overrightarrow{OB}$ can coincide with $\overrightarrow{OA}$ after rotating a certain angle around any rotation axis passing the point O and located in Plane DOC.

It is proved as follows: Any unit vector axis $\overrightarrow{OE}$ passing O and located in the plane DOC is selected, then there must be constants a and b, and then:

$$\overrightarrow{OE} = a\overrightarrow{OC} + b\overrightarrow{OD} \qquad (4)$$

Because the unit vector $\overrightarrow{OC}$ is on the bisecting line of ∠AOB, and then $$\overrightarrow{OC} = \frac{\overrightarrow{OA} + \overrightarrow{OB}}{\|\overrightarrow{OA} + \overrightarrow{OB}\|} \quad (5)$$

Let $\|\overrightarrow{OA}+\overrightarrow{OB}\|=c$, (5) is substituted into (4), and then, $$\overrightarrow{OE} = \frac{a}{c}(\overrightarrow{OA} + \overrightarrow{OB}) + b\overrightarrow{OD} \quad (6)$$

The dot products of the vectors are further calculated as follow:

$$\overrightarrow{OE} \cdot \overrightarrow{OA} = \frac{a}{c}(\overrightarrow{OA} \cdot \overrightarrow{OA} + \overrightarrow{OB} \cdot \overrightarrow{OA}) + b\overrightarrow{OD} \cdot \overrightarrow{OA} \quad (7)$$

$$\overrightarrow{OE} \cdot \overrightarrow{OB} = \frac{a}{c}(\overrightarrow{OA} \cdot \overrightarrow{OB} + \overrightarrow{OB} \cdot \overrightarrow{OB}) + b\overrightarrow{OD} \cdot \overrightarrow{OB} \quad (8)$$

Since each vector is a unit vector and $\overrightarrow{OD}$ is perpendicular to $\overrightarrow{OA}$ and $\overrightarrow{OB}$, the following results are established:

$$\overrightarrow{OD} \cdot \overrightarrow{OA} = \overrightarrow{OD} \cdot \overrightarrow{OB} = 0$$

$$\overrightarrow{OA} \cdot \overrightarrow{OA} = \overrightarrow{OB} \cdot \overrightarrow{OB} = 1$$

$$\overrightarrow{OA} \cdot \overrightarrow{OB} = \overrightarrow{OB} \cdot \overrightarrow{OA} \quad (9)$$

(9) is substituted into (7) and (8), and then, $$\overrightarrow{OE} \cdot \overrightarrow{OA} = \overrightarrow{OE} \cdot \overrightarrow{OB} \quad (10)$$

Thus it is concluded that $\angle AOE = \angle BOE$, that is to say, $\overrightarrow{OB}$ must coincide with $\overrightarrow{OA}$ after rotating a certain angle around $\overrightarrow{OE}$, and the lemma is proved.

The main function of the lemma is to expand the selection range of the rotation axis. In addition to the optimal rotation axis $\overrightarrow{OD}$, rotation around a series of sub-optimal rotation axes in the same plane also can result in that the body axis points to the target axis. For the convenience, the plane DOC is referred to as a rotation axis plane. It should be noted that when the inclined angle of $\overrightarrow{OE}$ and $\overrightarrow{OD}$ is less than 90°, the angle of rotation required is less than 180°; when the inclined angle is larger than 90°, the angle of rotation required is larger than 180°, and the angle of rotation required is exactly 180° when they are perpendicular.

According to the rigid body dynamics equation, it is assumed that the rotational inertia matrix of the aircraft is I and the instantaneous angular velocity is ω, the angular acceleration of the aircraft under the control torque T is calculated as follows:

$$\dot{\omega} = I^{-1}(T - \omega \times I\omega) \quad (11)$$

When the instantaneous angular velocity of the star is small, the items in ω×Iω are all second-order infinitesimal and can be approximately ignored, and then $$\dot{\omega} \approx I^{-1}T \quad (12)$$

Since the torque T is located in the normal plane of the local geomagnetic field B, T must be linearly represented by a pair of non-parallel vectors X and Y in the normal plane, that is, for any magnetic control torque T, the following is must concluded:

$$T = aX + bY \quad (13)$$

where a and b are constant coefficients; the constants are substituted into (12), then $$\dot{\omega} \approx a(I^{-1}X) + b(I^{-1}Y) = aX' + bY' \quad (14)$$

According to the parallel retention of affine coordinate transformation, since X and Y are not parallel, X' and Y' must also be non-parallel after affine transformation, an angular acceleration generated by any torque T in the normal plane (the plane formed by X and Y) of the magnetic field is located in the plane formed by the vectors X' and Y' (the plane is simply referred to as the angular acceleration plane), thereby forming one-to-one mapping from the normal plane (also regarded as a magnetic torque plane) of the magnetic field to the angular acceleration plane by affine coordinate transformation. A unit normal vector of the angular acceleration plane may be obtained according to the following equation:

$$Z' = \frac{X' \times Y'}{\|X' \times Y'\|} \quad (15)$$

Obviously, Z' is an ideal normal vector of the angular acceleration plane.

Figure 4:
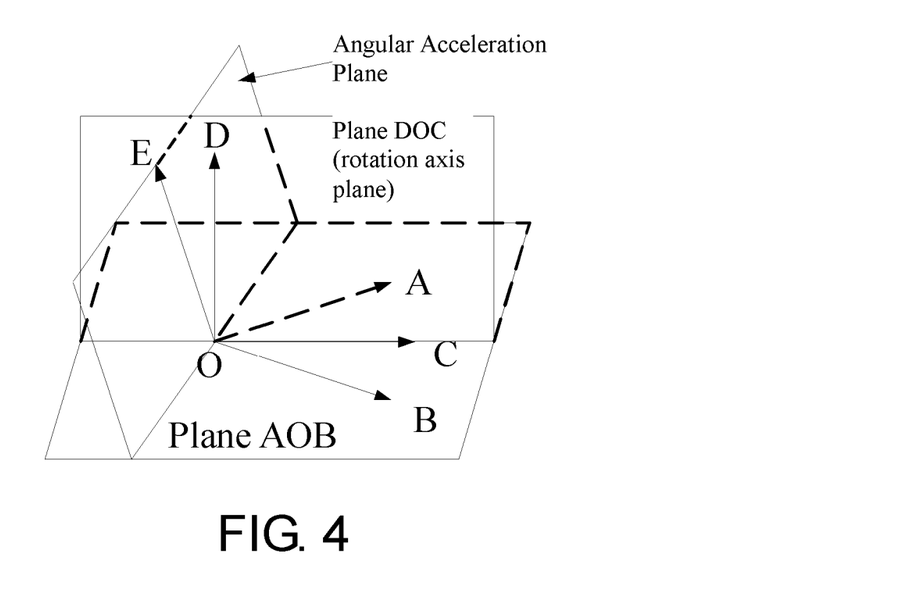
FIG. 4 is a schematic diagram of an optimal rotation axis direction.

In summary, when the instantaneous angular velocity is very small, the angular acceleration generated by the magnetic control torque in the normal plane of the magnetic field is approximately located in the angular acceleration plane. According to the conclusion of Lemma 1, the angular acceleration control can be performed according to the following method:

(1) when the angular acceleration plane is parallel to the rotation axis plane, a rotation angular acceleration $\dot{\omega}_r$ can be generated along the direction of the optimal rotation axis $\overrightarrow{OD}$, so that a tendency of rotating $\overrightarrow{OA}$ to $\overrightarrow{OB}$ is generated;

(2) when the angular acceleration plane is not parallel to the rotation axis plane, the two planes must have an intersection line, and a rotation angular acceleration $\dot{\omega}_r$ is generated along the intersection line $\overrightarrow{OE}$, and a tendency of rotating $\overrightarrow{OA}$ to $\overrightarrow{OB}$ is also generated, as shown in FIG. 4;

(3) the modulus value of the rotation angular acceleration $\dot{\omega}_r$ should be proportional to the inclined angle of $\overrightarrow{OA}$ and $\overrightarrow{OB}$ and moreover the problem that large overshoot is caused by the angular velocity on $\overrightarrow{OE}$ can be prevented;

(4) in order to ensure the system stability, angular velocity damping should be performed, that is, a damped angular acceleration $\dot{\omega}_d$ is generated in the opposite direction of the projection of the instantaneous angular velocity of the aircraft in the angular acceleration plane, and the modulus value of the damped angular acceleration is proportional to the modulus value of the corresponding projection;

(5) the angular acceleration generated by the actual control torque output should be the vector sum of the rotation angular acceleration $\dot{\omega}_r$ and the damped angular acceleration $\dot{\omega}_d$.

The direction of rotation angular acceleration $\dot{\omega}_r$ can be calculated according to the following equation:

$$\overrightarrow{OE} = NORM(\overrightarrow{OC} \times \overrightarrow{OD} \times Z')$$
$$= NORM((\overrightarrow{OB} + \overrightarrow{OA}) \times (\overrightarrow{OB} \times \overrightarrow{OA}) \times Z') \quad (16)$$

where NORM is a vector normalization operator. Since the vector $\overrightarrow{OC} \times \overrightarrow{OD}$ is the normal of the rotation axis plane and Z' is the normal of the angular acceleration plane, so $\overrightarrow{OE}$ is perpendicular to the normals of both the rotation axis plane and the angular acceleration plane, that is, both in the rotation axis plane and the angular acceleration plane (the two planes intersect with each other), X and Y are any two non-parallel vectors in the normal plane of the magnetic field. The magnitude and direction of the rotation angular acceleration can be calculated as follows:

$$\omega_r = (K_p \beta \vec{OE}) \text{sign}(\vec{OE} \cdot (\vec{OB} \times \vec{OA})) + K_m (\omega \cdot \vec{OE}) \quad (17)$$

where $K_p$ refers to a control coefficient; $\beta$ is the inclined angle of the body axis and the target axis; sign is to obtain a positive/negative operator which is valued as 1 when the dot product of the vectors $\vec{OE}$ and $\vec{OD}$ is positive (the inclined angle is less than 90°) or valued as −1 when the dot product is negative, or valued as 0 when the body axis and the target axis are perpendicular; $K_m$ refers to a control coefficient for controlling the angular velocity in the direction $\vec{OE}$. A damped angular acceleration can be calculated according to the following equation:

$$\dot{\omega}_d = K_d [\omega - (\omega \cdot Z') Z'] \quad (18)$$

where $K_d$ refers to a control coefficient for dampening an angular velocity component in the angular acceleration plane; $\omega$ is the instantaneous angular velocity of the star, $(\omega \cdot Z')Z'$ is a component perpendicular to the angular acceleration plane in $\omega$, so $\omega - (\omega \cdot Z')Z'$ is a component in the angular acceleration plane in $\omega$. A torque required to generate the rotation angular acceleration and the damped angular acceleration is then calculated as follows:

$$T = I(\omega_r + \omega_d) \quad (19)$$

where I is the rotational inertia of the spacecraft. It can be seen from the above derivation that since $\omega_r + \omega_d$ is in the angular acceleration plane, the torque T must be in the normal plane of the magnetic field. Then, the required control magnetic torque M can be obtained by the equation (2). Since the torque T is perpendicular to the magnetic field B, it can be completely generated by a magnetorquer.

Figure 5:
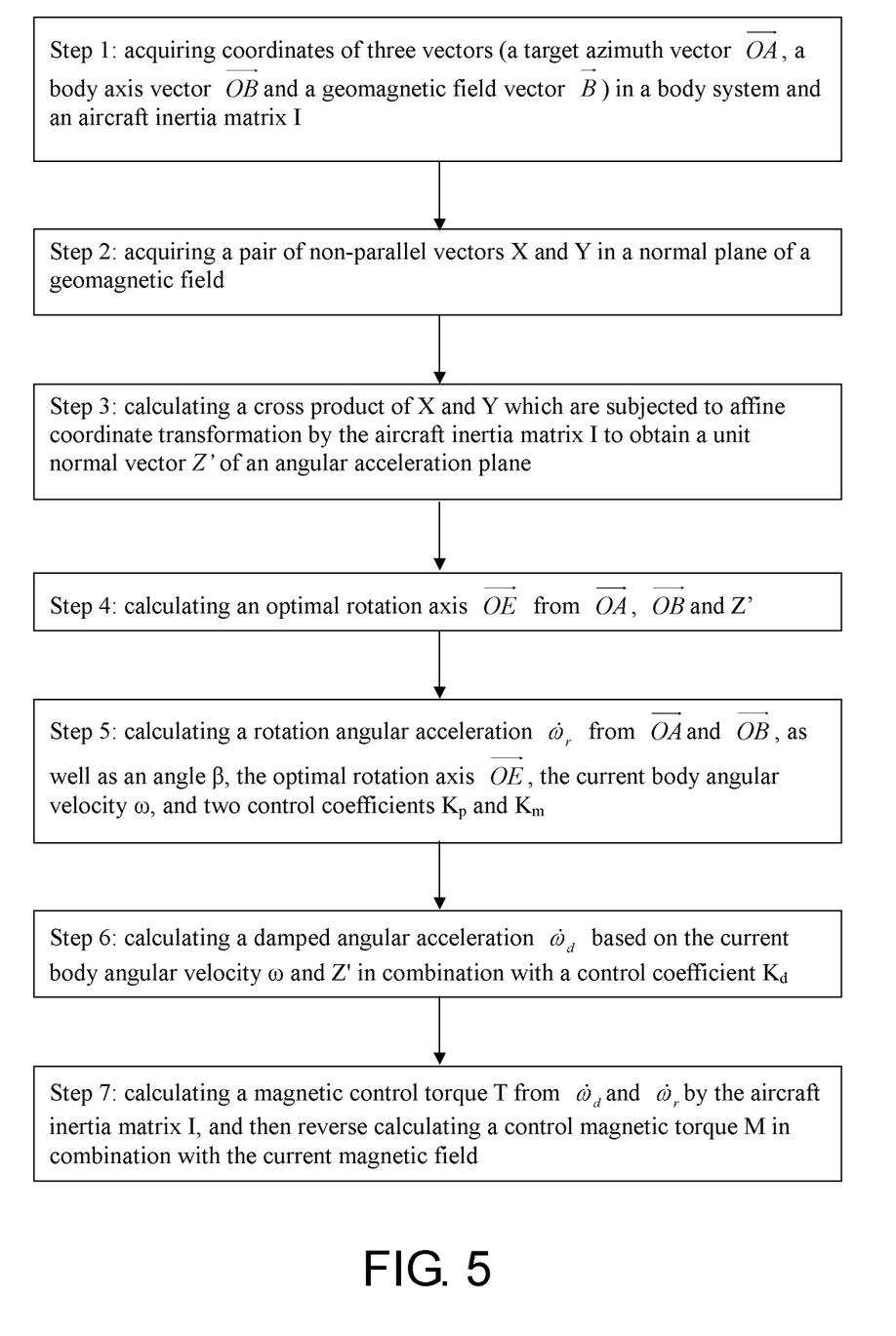
FIG. 5 is a flow chart of the method of the invention.
Figure 6:
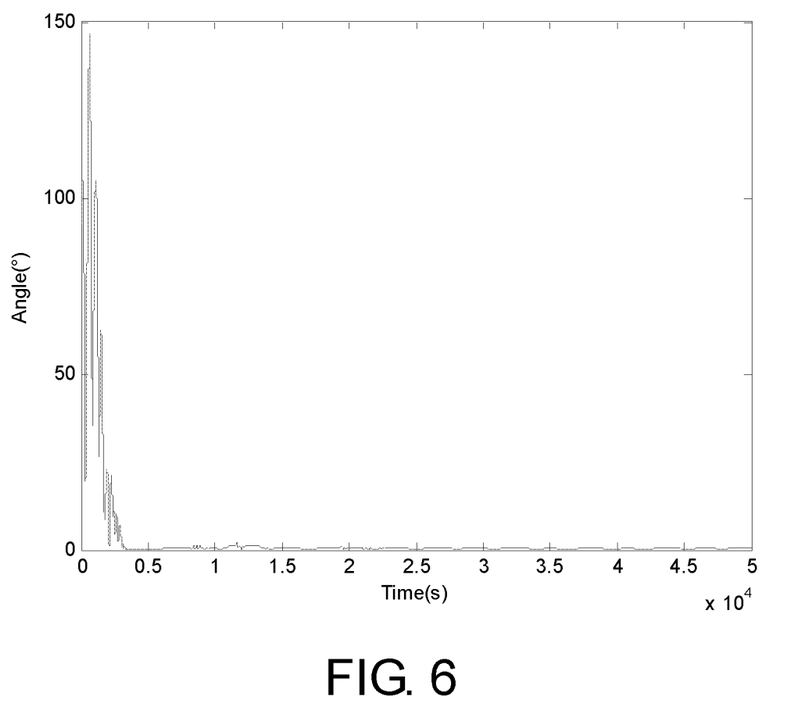
FIG. 6 is a simulation result of a point-to-ground error angle curve.
Figure 7:
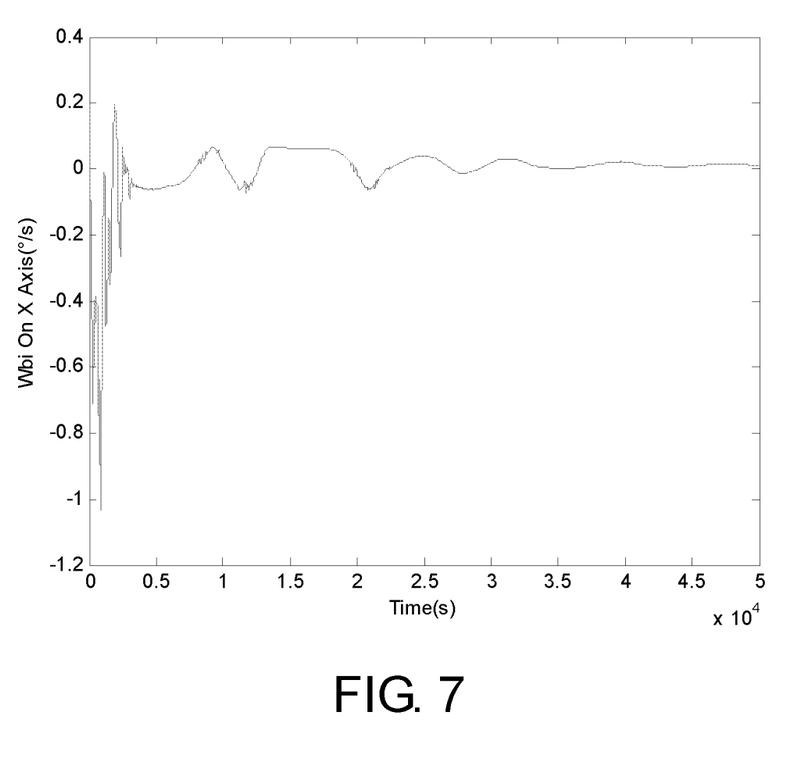
FIG. 7 is a simulation result of an X-axis angular velocity curve.
Figure 8:
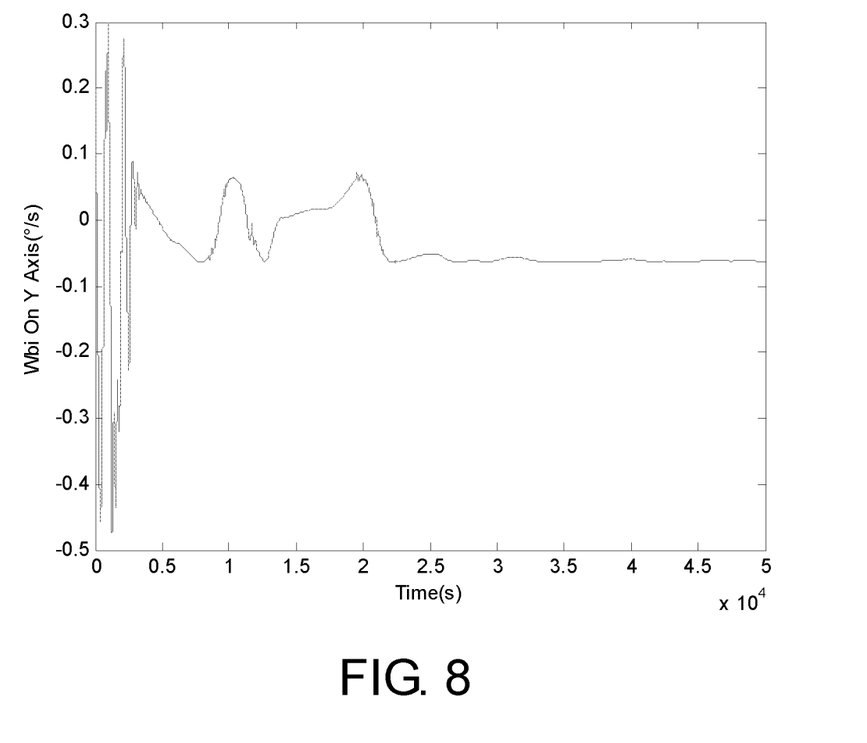
FIG. 8 is a simulation result of a Y-axis angular velocity curve.
Figure 9:
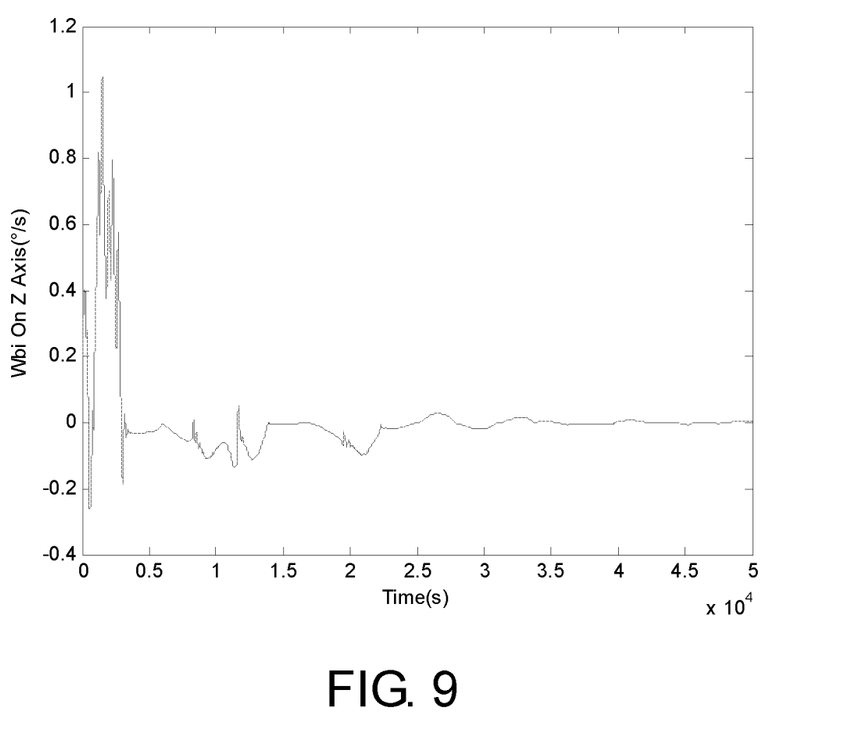
FIG. 9 is a simulation result of a Z-axis angular velocity curve.

In summary, as shown in FIG. 5, the implementation steps of the single-axis pointing magnetic control algorithm designed by the invention are as follows:

① acquiring the following data: coordinates of three vectors, a target azimuth vector $\vec{OA}$, a body axis vector $\vec{OB}$ and a geomagnetic field vector $\vec{B}$, in a body system and an aircraft inertia matrix I;

② acquiring a pair of non-parallel vectors X and Y in a normal plane of a geomagnetic field, and calculating a cross product of $\vec{B}$ and any vector that is not parallel to the geomagnetic field vector $\vec{B}$ to obtain a vector X, and calculating a cross product of X and $\vec{B}$ to obtain Y;

③ acquiring a unit normal vector Z' of an angular acceleration plane according to the equations (14) and (15);

④ acquiring $\vec{OE}$ according to the equation (16);

⑤ adjusting control coefficients and calculating a magnetic control torque T according to the equations (17), (18) and (19), wherein T must be in the normal plane of the magnetic field in this case; and ⑥ calculating the required control magnetic torque M according to the equation (2).

The algorithm of the invention is essentially a PD control method based on geometric analysis and affine coordinate transformation. The algorithm is simple and easy to implement, and can be completely applied to practical engineering applications.

The simulation test is carried out under Matlab. The pure magnetic control is used to cause the Z axis of the star to point to the center of the earth to form a slowly changing follow-up system. The simulation parameters are shown in Table 1:

TABLE 1

| Simulation parameters | |
| --- | --- |
| Orbital attitude | 500 Km |
| Orbital inclination | 30° |
| Orbital eccentricity | 0 |
| Initial pointing deviation | 92° |
| Each axial initial angular velocity | 0.2°/s |
| Three-axis residual magnetism | 0.6 Am$^2$ |
| Maximum output of magnetorquer | 25 Am$^2$ |
| Kp | 0.001 |
| Km | −0.001 |
| Kd | −0.01 |

The simulation results are as shown in FIG. 6, FIG. 7, FIG. 8 and FIG. 9. When the pointing error longitude is converged to be less than 1° and the angular velocity of each axis is also controlled when the attitude is less than 10000 s. The simulation is carried out under the condition that other simulation parameters are unchanged and only the orbital inclination is modified. It is confirmed that the method of the invention can obtain good control results under the orbital inclination ranging from 30° to 90°, only with the difference in convergence time.

The foregoing is a further detailed description of the invention in connection with the specific preferred embodiments, and it is not to be determined that the specific embodiments of the invention are limited to these descriptions. Multiple simple deductions or replacements made by those skilled in the field to which the invention belongs, without departing from the spirit and scope of the invention, shall be considered as falling within the scope of the invention.

What is claimed is:

1. An attitude control method for a spacecraft, wherein the attitude control method comprises the following steps:

① acquiring following data: coordinates of a target azimuth vector $\vec{OA}$, a body axis vector $\vec{OB}$ and a geomagnetic field vector $\vec{B}$ in a body system and an aircraft inertia matrix I;

② acquiring a pair of non-parallel vectors X and Y in a normal plane of a geomagnetic field;

③ calculating a unit normal vector Z' of an angular acceleration plane through affine transformation of the aircraft inertia matrix I:

$$X' = I^{-1} X$$
$$Y' = I^{-1} Y$$
$$Z' = \frac{X' \times Y'}{\|X' \times Y'\|}$$

wherein X' and Y' are affine transformed vectors of X and Y and are approximately in the angular acceleration plane generated by a magnetic torque;

④ acquiring an optimal control rotation axis vector $\vec{OE}$ by a following equation:

$$\vec{OE} = \text{NORM}((\vec{OB} + \vec{OA}) \times (\vec{OB} \times \vec{OA}) \times Z')$$

where NORM is a vector normalization operator;

⑤ adjusting control coefficients and calculating a magnetic control torque T, wherein the magnetic control torque T must be in the normal plane of the magnetic field in this case, and the magnetic control torque T is calculated specifically by: calculating a magnitude and a direction of a rotation angular acceleration, $$\omega_r = (K_p \beta \overrightarrow{OE}) \text{sign}(\overrightarrow{OE} \cdot (\overrightarrow{OB} \times \overrightarrow{OA})) + K_m(\omega \cdot \overrightarrow{OE}) \quad (17)$$

wherein Kp refers to a control coefficient; $\beta$ is an inclined angle between the body axis vector $\overrightarrow{OB}$ and the target azimuth vector $\overrightarrow{OA}$; sign is to obtain a positive/negative operator which is valued as 1 when a dot product of the vectors $\overrightarrow{OE}$ and $\overrightarrow{OD}$ is positive or valued as −1 when the dot product is negative, or valued as 0 when the body axis vector and the target azimuth vector are perpendicular; an optimal rotation axis $\overrightarrow{OD}$ is perpendicular to $\overrightarrow{OA}$ and $\overrightarrow{OB}$; Km refers to a control coefficient for controlling an angular velocity in a direction of the vector $\overrightarrow{OE}$; next, calculating a damped angular acceleration:

$$\dot{\omega}_d = K_d[\omega - (\omega \cdot Z')Z']$$

wherein Kd refers to a control coefficient; $\omega$ is the instantaneous angular velocity of the star, $(\omega \cdot Z')Z'$ is a component perpendicular to the angular acceleration plane in $\omega$, so $\omega - (\omega \cdot Z')Z'$ is a component in the angular acceleration plane in $\omega$; and then calculating a torque required to generate the rotation angular acceleration and the damped angular acceleration:

$$T = I(\dot{\omega}_r + \dot{\omega}_d);$$

⑥ calculating a required control magnetic torque M:

$$\vec{M} = \frac{\vec{B} \times \vec{T}}{\|\vec{B}\|^2};$$

and

⑦ controlling the spacecraft according to the required control magnetic torque M.

2. The attitude control method of claim 1, wherein the step ② is specifically: calculating a cross product of $\vec{B}$ and any vector that is not parallel to the geomagnetic field vector $\vec{B}$ to obtain a vector X, and calculating a cross product of X and $\vec{B}$ to obtain Y.

* * * * *